US011055686B2

(12) United States Patent
Graves et al.

(10) Patent No.: US 11,055,686 B2
(45) Date of Patent: Jul. 6, 2021

(54) S/M FOR PROVIDING, RELOADING, AND REDEEMING STORED VALUE CARDS USED IN TRANSIT APPLICATIONS

(71) Applicants: Phillip Graves, Atlanta, GA (US); Merrill Brooks Smith, Ft. Lauderdale, FL (US); Phil M Chakiris, Atlanta, GA (US); Michael Parlotto, Playa Vista, CA (US)

(72) Inventors: Phillip Graves, Atlanta, GA (US); Merrill Brooks Smith, Ft. Lauderdale, FL (US); Phil M Chakiris, Atlanta, GA (US); Michael Parlotto, Playa Vista, CA (US)

(73) Assignee: E2INTERACTIVE, INC., Atlanta, GA (US)

( * ) Notice: Subject to any disclaimer, the term of this patent is extended or adjusted under 35 U.S.C. 154(b) by 1034 days.

(21) Appl. No.: 13/959,379

(22) Filed: Aug. 5, 2013

(65) Prior Publication Data

US 2014/0046737 A1 Feb. 13, 2014

Related U.S. Application Data

(60) Provisional application No. 61/680,802, filed on Aug. 8, 2012.

(51) Int. Cl.
*G06Q 20/28* (2012.01)
*G06Q 20/20* (2012.01)
(Continued)

(52) U.S. Cl.
CPC ......... *G06Q 20/28* (2013.01); *G06Q 20/0655* (2013.01); *G06Q 20/20* (2013.01);
(Continued)

(58) Field of Classification Search
CPC ... G07B 15/04; G07B 15/00; G06Q 20/22–29
See application file for complete search history.

(56) References Cited

U.S. PATENT DOCUMENTS 3,288,350 A 11/1966 Kushner
5,091,634 A 2/1992 Finch et al.
(Continued)

FOREIGN PATENT DOCUMENTS

CN 102609839 A 7/2012
EP 1164777 A 12/2001
(Continued)

OTHER PUBLICATIONS

Alliance, Smart Card. "A Guide to Prepaid Cards for Transit Agencies." A Smart. 2011. (Year: 2011).*
(Continued)

*Primary Examiner* — Scott M Tungate
(74) *Attorney, Agent, or Firm* — Landmark Intellectual Property Law, PLLC; Gregory Murphy

(57) ABSTRACT

The invention is directed to systems and methods of conducting transactions associated with a transit card. A method of conducting transactions may be conducted between a processor and a transit processor. Steps may include receiving a redemption request and determining if it is a pre-authorization request or a redemption; if the redemption request is a pre-authorization request, determining if the account is authorized for a particular transit type. If the account is authorized, communicating approval to the transit processor. If the account is not authorized communicating denial. If the redemption request is a redemption: determining if account value is sufficient to pay the redemption amount; if not, denying and if so approving the transaction and deducting the amount, and determining if the account value is below a pre-determined threshold for a particular
(Continued)

transit types, and if so, updating the status of the account at a data store.

12 Claims, 10 Drawing Sheets

(51) Int. Cl.
    *G06Q 20/34*     (2012.01)
    *G06Q 20/06*     (2012.01)
    *G06Q 20/40*     (2012.01)

(52) U.S. Cl.
    CPC ......... *G06Q 20/342* (2013.01); *G06Q 20/349* (2013.01); *G06Q 20/352* (2013.01); *G06Q 20/354* (2013.01); *G06Q 20/4037* (2013.01)

(56) References Cited

U.S. PATENT DOCUMENTS

| | | |
|---|---|---|
| 5,128,520 A | 6/1992 | Rando |
| 5,231,569 A | 7/1993 | Myatt |
| 5,256,863 A | 10/1993 | Ferguson |
| 5,375,240 A | 12/1994 | Grundy |
| 5,416,306 A | 5/1995 | Imhata |
| 5,602,377 A | 2/1997 | Beller et al. |
| 5,619,559 A | 4/1997 | Kennedy |
| 5,671,279 A | 9/1997 | Elgamal |
| 5,708,780 A | 1/1998 | Levergood |
| 5,729,693 A | 3/1998 | Holda-Fleck |
| 5,740,915 A | 4/1998 | Williams |
| 5,754,981 A | 5/1998 | Veeneman |
| 5,765,143 A | 6/1998 | Sheldon |
| 5,804,803 A | 9/1998 | Cragun |
| 5,850,217 A | 12/1998 | Cole |
| 5,857,175 A | 1/1999 | Day |
| 5,897,625 A | 4/1999 | Gustin |
| 5,903,633 A | 5/1999 | Lorsch |
| 5,907,142 A | 5/1999 | Kelsey |
| 5,950,173 A | 9/1999 | Perkowski |
| 5,968,110 A | 10/1999 | Westrope |
| 6,014,635 A | 1/2000 | Harris |
| 6,029,139 A | 2/2000 | Bezos |
| 6,039,244 A | 3/2000 | Finsterwald |
| 6,085,167 A | 7/2000 | Iguchi |
| 6,085,242 A | 7/2000 | Chandra |
| 6,119,099 A | 9/2000 | Walker |
| 6,125,352 A | 9/2000 | Franklin |
| 6,134,533 A | 10/2000 | Shell |
| 6,138,911 A | 10/2000 | Fredregil |
| 6,154,738 A | 11/2000 | Call |
| 6,222,914 B1 | 4/2001 | McMullin |
| 6,304,860 B1 | 10/2001 | Martin |
| 6,315,193 B1 | 11/2001 | Hogan |
| 6,317,028 B1 | 11/2001 | Valiulis |
| 6,360,254 B1 | 3/2002 | Linden |
| 6,418,414 B1 | 7/2002 | Lutz et al. |
| 6,418,441 B1 | 7/2002 | Call |
| 6,422,462 B1 | 7/2002 | Cohen |
| 6,424,706 B1 | 7/2002 | Katz et al. |
| 6,442,532 B1 | 8/2002 | Kawan |
| 6,473,739 B1 | 10/2002 | Showghi et al. |
| 6,507,823 B1 | 1/2003 | Nel |
| 6,529,956 B1 | 3/2003 | Smith |
| 6,536,659 B1 | 3/2003 | Hauser |
| 6,609,106 B1 | 8/2003 | Robertson |
| 6,648,222 B2 | 11/2003 | McDonald et al. |
| 6,675,153 B1 | 1/2004 | Cook et al. |
| 6,829,596 B1 | 12/2004 | Frazee |
| 6,834,796 B2 | 12/2004 | Anvekar et al. |
| 6,852,031 B1 | 2/2005 | Rowe |
| 6,886,742 B2 | 5/2005 | Stoutenburg et al. |
| 6,915,277 B1 | 7/2005 | Manchester et al. |
| 6,965,866 B2 | 11/2005 | Klein |
| 6,993,510 B2 | 1/2006 | Guy |
| 7,003,499 B2 | 2/2006 | Arditti et al. |
| 7,063,251 B2 | 6/2006 | Namekawa |
| 7,086,586 B1 | 8/2006 | Sullivan |
| 7,108,183 B1 | 9/2006 | Cox, Jr. |
| 7,216,092 B1 | 5/2007 | Weber |
| 7,252,226 B2 | 8/2007 | Risafi et al. |
| 7,363,265 B2 | 4/2008 | Horgan |
| 7,434,729 B2 | 10/2008 | Cracchiolo et al. |
| 7,475,028 B2 | 1/2009 | Loeb |
| 7,494,417 B2 | 2/2009 | Walker |
| 7,513,422 B1 | 4/2009 | Tucker |
| 7,590,557 B2 | 9/2009 | Harrison |
| 7,631,803 B2 | 12/2009 | Peyret et al. |
| 7,702,542 B2 | 4/2010 | Aslanian |
| 7,757,944 B2 | 7/2010 | Cline |
| 7,769,695 B2 | 8/2010 | Robinson |
| 7,922,083 B2 | 4/2011 | Harrison |
| 7,970,626 B2 | 6/2011 | Cracchiolo |
| 8,036,953 B2 | 10/2011 | Hsu |
| 8,103,520 B2 | 1/2012 | Mueller |
| 8,181,867 B1 | 5/2012 | Bierbaum et al. |
| 8,245,910 B2 | 8/2012 | Sullivan et al. |
| 8,265,950 B2 | 9/2012 | Howe |
| 8,332,277 B2 | 12/2012 | Mccaffery et al. |
| 8,577,735 B2 | 11/2013 | Wilen |
| 8,636,203 B1 | 1/2014 | Patterson |
| 9,098,190 B2 | 8/2015 | Zhou |
| 9,483,786 B2 | 11/2016 | Glass |
| 9,672,687 B2 | 6/2017 | Cage |
| 2001/0034609 A1 | 10/2001 | Dovolis |
| 2001/0037264 A1 | 11/2001 | Husemann et al. |
| 2001/0056410 A1 | 12/2001 | Ishigaki |
| 2002/0010627 A1 | 1/2002 | Lerat |
| 2002/0016749 A1 | 2/2002 | Borecki et al. |
| 2002/0062249 A1 | 5/2002 | Iannacci |
| 2002/0065713 A1 | 5/2002 | Awada et al. |
| 2002/0070270 A1 | 6/2002 | Narita et al. |
| 2002/0088855 A1 | 7/2002 | Hodes |
| 2002/0091573 A1 | 7/2002 | Hodes |
| 2002/0130176 A1 | 9/2002 | Suzuki |
| 2002/0138573 A1 | 9/2002 | Saguy |
| 2002/0153410 A1 | 10/2002 | Santini |
| 2002/0198737 A1 | 12/2002 | Valtanen |
| 2002/0198831 A1 | 12/2002 | Patricelli et al. |
| 2003/0004802 A1 | 1/2003 | Callegari |
| 2003/0009382 A1 | 1/2003 | D'Arbeloff |
| 2003/0069846 A1 | 4/2003 | Marcon |
| 2003/0105688 A1 | 6/2003 | Brown et al. |
| 2003/0121967 A1 | 7/2003 | Goldberg et al. |
| 2003/0149573 A1 | 8/2003 | Lynton |
| 2003/0163787 A1 | 8/2003 | Hay et al. |
| 2003/0172039 A1 | 9/2003 | Guy |
| 2003/0197059 A1 | 10/2003 | Tidball et al. |
| 2003/0234819 A1 | 12/2003 | Daly et al. |
| 2004/0010449 A1 | 1/2004 | Berardi et al. |
| 2004/0065726 A1 | 4/2004 | McGee et al. |
| 2004/0117302 A1 | 6/2004 | Weichert et al. |
| 2004/0153344 A1 | 8/2004 | Bui |
| 2004/0185881 A1 | 9/2004 | Lee |
| 2004/0193490 A1 | 9/2004 | Pletz |
| 2004/0225560 A1 | 11/2004 | Lewis et al. |
| 2004/0267663 A1 | 12/2004 | Karns |
| 2005/0021458 A1 | 1/2005 | Rowe |
| 2005/0027624 A1 | 2/2005 | Cai |
| 2005/0045732 A1 | 3/2005 | Whitaker |
| 2005/0086100 A1* | 4/2005 | Yanagisawa ........... G01C 21/26 705/13 |
| 2005/0086168 A1 | 4/2005 | Alvarez |
| 2005/0108121 A1 | 5/2005 | Gravett et al. |
| 2005/0116028 A1* | 6/2005 | Cohen ................ G06Q 20/28 235/380 |
| 2005/0125300 A1 | 6/2005 | Mcgill et al. |
| 2005/0182695 A1 | 8/2005 | Lubow et al. |
| 2005/0199705 A1 | 9/2005 | Beck et al. |
| 2005/0261968 A1 | 11/2005 | Randall et al. |
| 2005/0274793 A1 | 12/2005 | Cantini |
| 2006/0004631 A1 | 1/2006 | Roberts et al. |
| 2006/0010007 A1 | 1/2006 | Denman |
| 2006/0035631 A1 | 2/2006 | White et al. |
| 2006/0037835 A1 | 2/2006 | Doran |

(56) References Cited

U.S. PATENT DOCUMENTS

| | | |
|---|---|---|
| 2006/0041470 A1 | 2/2006 | Filho et al. |
| 2006/0053056 A1 | 3/2006 | Alspach-Goss et al. |
| 2006/0078100 A1 | 4/2006 | Risafi et al. |
| 2006/0080174 A1 | 4/2006 | Veeneman |
| 2006/0089160 A1 | 4/2006 | Othmer |
| 2006/0113376 A1 | 6/2006 | Reed et al. |
| 2006/0212345 A1 | 9/2006 | Soza |
| 2006/0253320 A1 | 11/2006 | Heywood |
| 2006/0255125 A1 | 11/2006 | Jennings |
| 2006/0261150 A1 | 11/2006 | Seifert et al. |
| 2006/0271423 A1 | 11/2006 | Hiranoya |
| 2006/0277146 A1 | 12/2006 | Dively et al. |
| 2007/0011025 A1 | 1/2007 | Cracchiolo |
| 2007/0017975 A1 | 1/2007 | Lewis et al. |
| 2007/0021969 A1 | 1/2007 | Homeier-Beals |
| 2007/0030824 A1 | 2/2007 | Ribaudo |
| 2007/0038577 A1 | 2/2007 | Werner |
| 2007/0043682 A1 | 2/2007 | Drapkin et al. |
| 2007/0055785 A1 | 3/2007 | Stevens |
| 2007/0156436 A1 | 4/2007 | Fisher |
| 2007/0125838 A1 | 6/2007 | Law et al. |
| 2007/0136149 A1 | 6/2007 | Woodward et al. |
| 2007/0162338 A1 | 7/2007 | Lawe |
| 2011/0060904 A9 | 7/2007 | Whitfield |
| 2007/0192182 A1 | 8/2007 | Monaco et al. |
| 2007/0198433 A1 | 8/2007 | McGee et al. |
| 2007/0214080 A1 | 9/2007 | Babi et al. |
| 2007/0251995 A1 | 11/2007 | Kingsborough et al. |
| 2007/0265872 A1* | 11/2007 | Robinson ............... G06Q 10/02 705/5 |
| 2008/0028395 A1 | 1/2008 | Motta et al. |
| 2008/0040265 A1 | 2/2008 | Rackley |
| 2008/0052169 A1 | 2/2008 | O'Shea et al. |
| 2008/0059226 A1 | 3/2008 | Melker |
| 2008/0059318 A1 | 3/2008 | Packes et al. |
| 2008/0078831 A1 | 4/2008 | Johnson et al. |
| 2008/0097851 A1 | 4/2008 | Bemmel et al. |
| 2008/0114696 A1 | 5/2008 | Singh et al. |
| 2008/0116264 A1 | 5/2008 | Hammad |
| 2008/0133351 A1 | 6/2008 | White et al. |
| 2008/0179395 A1* | 7/2008 | Dixon ................. G06Q 20/027 235/380 |
| 2008/0186174 A1 | 8/2008 | Alexis et al. |
| 2008/0209511 A1 | 8/2008 | Silverbrook |
| 2008/0255942 A1 | 10/2008 | Craft |
| 2008/0319868 A1 | 12/2008 | Briscoe |
| 2009/0037326 A1 | 2/2009 | Chitti et al. |
| 2009/0076896 A1 | 3/2009 | Dewitt |
| 2009/0078755 A1 | 3/2009 | Sullivan et al. |
| 2009/0094126 A1 | 4/2009 | Killian et al. |
| 2009/0111378 A1 | 4/2009 | Sheynman |
| 2009/0112709 A1 | 4/2009 | Barhydt et al. |
| 2009/0144161 A1 | 6/2009 | Fisher |
| 2009/0157487 A1 | 6/2009 | Cottrell et al. |
| 2009/0164329 A1 | 6/2009 | Bishop et al. |
| 2009/0164375 A1 | 6/2009 | Saunders et al. |
| 2009/0171739 A1 | 7/2009 | De et al. |
| 2009/0172551 A1 | 7/2009 | Kane |
| 2009/0187491 A1 | 7/2009 | Bull |
| 2009/0192904 A1 | 7/2009 | Patterson et al. |
| 2009/0192928 A1 | 7/2009 | Abifaker |
| 2009/0247131 A1 | 10/2009 | Champion |
| 2009/0254432 A1 | 10/2009 | Mccaffery et al. |
| 2009/0281941 A1 | 11/2009 | Worth |
| 2009/0287558 A1 | 11/2009 | Seth et al. |
| 2009/0298427 A1 | 12/2009 | Wilkinson |
| 2009/0314833 A1* | 12/2009 | Ruiz .................... G07B 15/04 235/382 |
| 2010/0010906 A1 | 1/2010 | Grecia |
| 2010/0041368 A1 | 2/2010 | Kumar |
| 2010/0057580 A1 | 3/2010 | Raghunathan |
| 2010/0082490 A1 | 4/2010 | Rosenblatt |
| 2010/0088188 A1 | 4/2010 | Kumar et al. |
| 2010/0131415 A1 | 5/2010 | Sartipi |
| 2010/0185461 A1 | 7/2010 | Broeska et al. |
| 2010/0185505 A1 | 7/2010 | Sprogoe |
| 2010/0205063 A1 | 8/2010 | Mersky |
| 2010/0235290 A1 | 9/2010 | Junger |
| 2010/0293536 A1 | 11/2010 | Nikitin |
| 2010/0299194 A1 | 11/2010 | Snyder et al. |
| 2010/0304852 A1 | 12/2010 | Szrek |
| 2010/0312636 A1 | 12/2010 | Coulter et al. |
| 2011/0035268 A1 | 2/2011 | Rossi |
| 2011/0040684 A1 | 2/2011 | Beck et al. |
| 2011/0106698 A1 | 5/2011 | Isaacson |
| 2011/0161226 A1 | 6/2011 | Courtion |
| 2011/0165866 A1* | 7/2011 | Dixon ................... G07B 15/00 455/414.1 |
| 2011/0166992 A1 | 7/2011 | Dessert et al. |
| 2011/0202419 A1 | 8/2011 | Mamdani |
| 2011/0234514 A1 | 9/2011 | Gothard |
| 2011/0246284 A1 | 10/2011 | Chaikin |
| 2012/0136780 A1 | 5/2012 | El-Awady |
| 2012/0209688 A1 | 8/2012 | Lamothe et al. |
| 2012/0271689 A1 | 10/2012 | Etheredge |
| 2013/0073388 A1 | 3/2013 | Heath |
| 2013/0179177 A1 | 7/2013 | Dhavle et al. |
| 2013/0290121 A1 | 10/2013 | Simakov |
| 2013/0304561 A1 | 11/2013 | Warner et al. |
| 2014/0006268 A1 | 1/2014 | Roberts |
| 2014/0019238 A1 | 1/2014 | Blatchley |
| 2015/0278845 A1 | 10/2015 | Sorem et al. |
| 2017/0076293 A1 | 3/2017 | Cage |

FOREIGN PATENT DOCUMENTS

| | | |
|---|---|---|
| EP | 1705610 A1 | 9/2006 |
| EP | 1806705 A1 | 7/2007 |
| EP | 2034435 A1 | 3/2009 |
| EP | 2128809 A1 | 12/2009 |
| JP | 2002189963 A | 7/2002 |
| JP | 2003208541 A | 7/2003 |
| JP | 2008541303 A | 11/2008 |
| JP | 2010521017 A | 6/2010 |
| KR | 20020027427 A | 4/2002 |
| WO | 03075231 A1 | 9/2003 |
| WO | 2005086878 A2 | 9/2005 |
| WO | 2011079066 A1 | 6/2011 |

OTHER PUBLICATIONS

PCT International Search Report dated Dec. 30, 2013 for PCT/US13/53734.

* cited by examiner

S/M FOR PROVIDING, RELOADING, AND REDEEMING STORED VALUE CARDS USED IN TRANSIT APPLICATIONS

The present invention claims priority to U.S. Provisional Patent Application No. 61/680,802, filed on Aug. 8, 2012, which is incorporated herein in its entirety.

BACKGROUND OF THE INVENTION

The present invention is generally directed to systems and methods for conducting stored value card transactions in transit applications. Specifically, the present invention is directed to the retail, distribution, reloading, and redemption of stored value cards used in transit applications.

It has become commonplace for transit systems to require or utilize different forms of payment for different transit types. For example, a subway may require subway tokens, while a bus may require a bus pass. A train may require a ticket while a road toll may require a cash payment. Payment of multiple transit types can be inconvenient to a user. Accordingly, a system in which a value source may be redeemed at one or more transit types is desirable.

Moreover, transit payment systems that allow for various stored value to be used often require timely registration and a delay between registering for a transit card or transponder and receiving it. Accordingly, the ability to purchase a transit card and/or transponder at a point of sale is desirable.

SUMMARY OF THE INVENTION

Aspects in accordance with some embodiments of the present invention may include A method of conducting transit card transactions, the method conducted amongst a central processor comprising an account associated with a transit card and a data store comprising a status of the account, and a transit processor, the method the comprising: receiving at the central processor from the transit processor a redemption request including information identifying the transit card; determining by the central processor whether the redemption request is a pre-authorization request for a particular transit type or a fee redemption request; upon a determination that the redemption request is a pre-authorization request: determining by the central processor whether the account is authorized for a transaction for the particular transit type based on factors including the status of the account; if the account is authorized for a transaction for the particular transit type, communicating approval of pre-authorization to the transit processor; if the account is not authorized for a transaction for the particular transit type, communicating denial of pre-authorization to the transit processor; upon a determination that the redemption request is a fee redemption request: determining by the central processor whether value associated with the account is greater than or equal to the amount requested by the fee redemption request; if the value associated with the account is less than the amount requested by the fee redemption request, communicating a denial of the fee redemption request to the transit processor; if the value associated with the account is greater than or equal to the amount requested by the fee redemption request: communicating approval of the fee redemption request to the transit processor; deducting the amount of the set fee redemption request from the account; determining whether the amount of value associated with the account is below a pre-determined threshold for one or more particular transit types, and if so, updating the status of the account at the data store.

Some aspects in accordance with some embodiments of the invention may include a method of conducting transit card transactions, the method conducted amongst a central processor comprising an account associated with a transit card and a data store comprising a status of the account, and a transit processor, the method the comprising: receiving at the central processor from a retailer point of sale (POS) an activation request comprising information identifying the transit card; determining by the central processor: if the information identifying the transit card is valid; and the account associated with the transit card; and activating the transit card by the central processor; receiving at the central processor from the transit processor a redemption request including information identifying the transit card; determining by the central processor whether the redemption request is a pre-authorization request for a particular transit type or a fee redemption request; upon a determination that the redemption request is a pre-authorization request: determining by the central processor whether the account is authorized for a transaction for the particular transit type based on factors including the status of the account; if the account is authorized for a transaction for the particular transit type, communicating approval of pre-authorization to the transit processor; if the account is not authorized for a transaction for the particular transit type, communicating denial of pre-authorization to the transit processor; upon a determination that the redemption request is a fee redemption request: determining by the central processor whether value associated with the account is greater than or equal to the amount requested by the fee redemption request; if the value associated with the account is less than the amount requested by the fee redemption request, communicating a denial of the fee redemption request to the transit processor; if the value associated with the account is greater than or equal to the amount requested by the fee redemption request: communicating approval of the fee redemption request to the transit processor; deducting the amount of the set fee redemption request from the account; determining whether the amount of value associated with the account is below a pre-determined threshold for one or more particular transit types, and if so, updating the status of the account at the data store.

Some aspects in accordance with some embodiments of the invention may include a method of conducting transit card transactions, the method conducted amongst a central processor comprising an account associated with a transit card and a data store comprising a status of the account, and a transit processor, the method the comprising: receiving at the central processor from the transit processor a redemption request including information identifying the transit card; determining by the central processor whether the redemption request is a pre-authorization request for a particular transit type or a fee redemption request; upon a determination that the redemption request is a pre-authorization request: determining by the central processor whether the account is authorized for a transaction for the particular transit type based on factors including the status of the account; if the account is authorized for a transaction for the particular transit type, communicating approval of pre-authorization to the transit processor; if the account is not authorized for a transaction for the particular transit type, communicating denial of pre-authorization to the transit processor; upon a determination that the redemption request is a fee redemption request: determining by the central processor whether value associated with the account is greater than or equal to the amount requested by the fee redemption request; if the value associated with the account is less than the amount requested by the fee redemption request, determining if exit from the particular transit type used in the fee redemption is necessary; if exit is necessary, authorizing the transaction for the total amount of value in the account and deducting the fee redemption request from the account, thereby causing a negative balance in the account; if exit is not necessary, communicating a denial of the fee redemption request to the transit processor; if the value associated with the account is greater than or equal to the amount requested by the fee redemption request: communicating approval of the fee redemption request to the transit processor; deducting the amount of the set fee redemption request from the account; determining whether the amount of value associated with the account is below a pre-determined threshold for one or more particular transit types, and if so, updating the status of the account at the data store.

Some aspects in accordance with some embodiments of the invention may include a system for conducting transactions using or associated with a transit card, comprising: a retailer point of sale (POS); a transit processor; a central processor in selective communication with the retailer POS and the transit processor, the central processor comprising: a first data store, comprising one or more records associated the transit card and indicating an amount of value associated with the transit card; a second data store, comprising one or more records associated with one or more transit cards, which may include the transit card, that are not authorized for transactions; a processor configured to: receive an activation request from the retailer POS to activate the transaction card, the activation request comprising information identifying the transit card; receive a redemption request from the transit processor; determine if the redemption request is a pre-authorization request for a particular transit type and if so, determine if the account is authorized for a transaction for the particular transit type based on factors including the status of the account; determine if the redemption request is a or a fee redemption request, and if value associated with the account is greater than or equal to the amount requested by the fee redemption request communicate approval of the transaction request to the transit processor.

These and other aspects will become apparent from the following description of the invention taken in conjunction with the following drawings, although variations and modifications may be effected without departing from the spirit and scope of the novel concepts of the invention.

BRIEF DESCRIPTION OF THE DRAWING

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

Figure 1A:
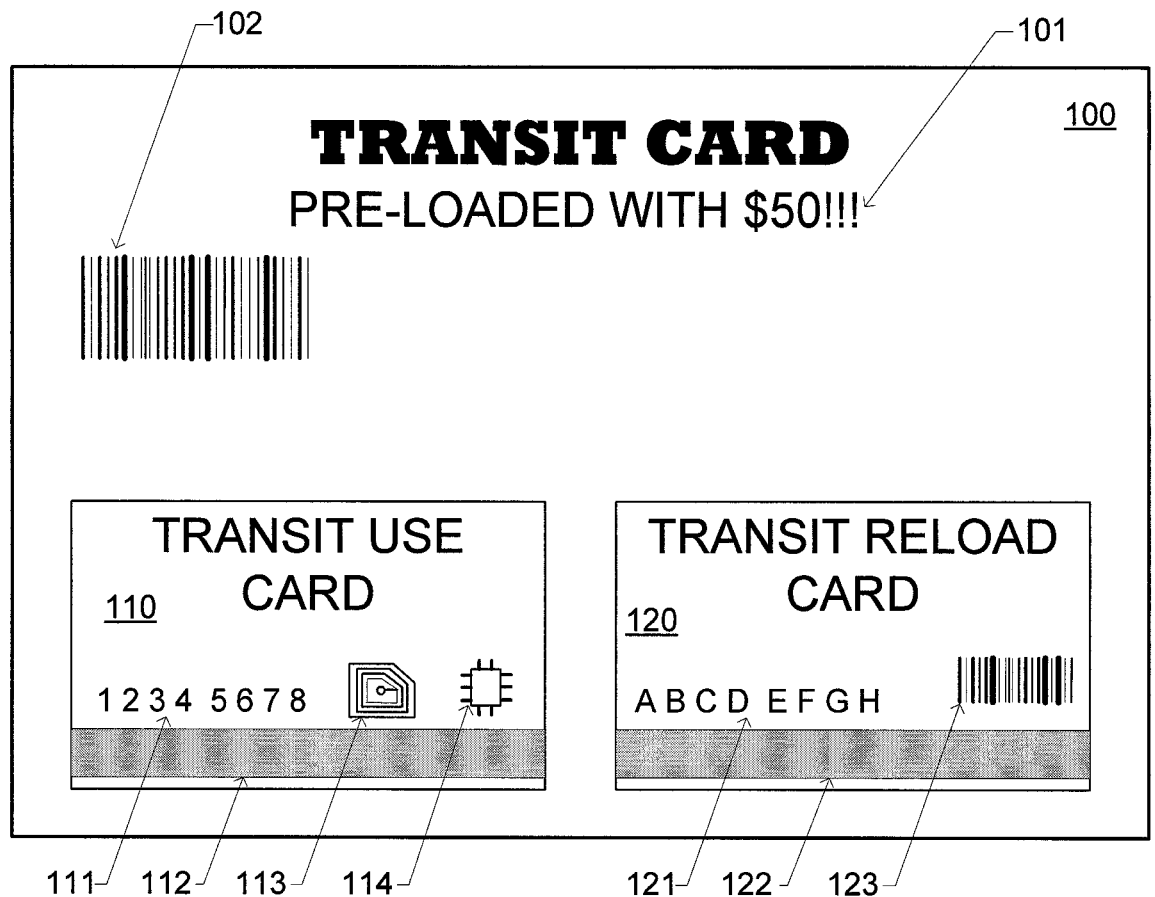
FIG. 1A illustrates an exemplary arrangement of a transit use card with a transit reload card, in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

The present invention contemplates the use of a stored value account linked to at least one card. The card may be equipped with a near field transponder or tag (for example, an RFID (radio frequency identification) tag) such that payments can be made while in the proximity of a reader, or triggered upon a contact or "tap" with a reader. The card may be used on and/or with various transit systems and/or authorities. For example, a user may use the card to pay for subway fare, bus fare, taxi fare, road and/or bridge tolls, and/or any other sort of transit charge.

The card may comprise at least one indicia setting forth a serial number or other identifying number of the card. This indicia may be associated with the stored value account such that use of the card in a transit system results in decrementation of value from the stored value account.

In accordance with some embodiments of the present invention, a second card may also be associated with the stored value account, but may not be equipped with a near field transponder, reader, or tag. The second card may comprise a machine readable indicia (for example, a bar code or magnetic stripe) that may be associated with the stored value account. Using this association, the second card may be presented at various point of sale terminals and used to add value—rather than decrement value—to the stored value account.

In this manner, a degree of anonymity may be maintained for the user of the first card. Payments that may comprise identification information—for example, a credit or debit card (dda) payment—may only be associated with the second card. The use of the first card may or may not be by the same user that provided value to the stored value account.

In this manner, parties can provide transit cards for other parties. For example, parents can provide transit cards for their children. Employers may provide transit cards to employees either as a benefit or to encourage public transportation. In accordance with some embodiments of the present invention, state or federal agencies may provide transit cards to low income or other identified parties.

The two cards—the near-field enabled card and the machine readable reload card—may be married or otherwise associated with each other. This association may occur, for example, at the printer or manufacturer of the cards, or later by a central processing party or other third party entity. In accordance with some embodiments of the present invention, an unaffiliated card may be associated with the near-field enabled card rather than the machine readable card in order to effectuate payment from other sources. For example, a generic prepaid card—such as a Visa—may be associated with the near-field enabled card to provide payment to the underlying stored value account. In accordance with some embodiments of the present invention, other forms of value accounts may be associated. For example, customer rewards or loyalty points may be associated with a quantum of value and associated with the near-field transit card. Similarly, frequent flyer miles or other such value types may be associated.

It is contemplated by the present invention that the two cards—the near-field enabled card and the machine readable reload card—may be packaged and marketed together. For example, this may be—but is not required to be—in the same package. In accordance with some embodiments of the present invention, the cards may be distributed separately, such that the machine readable reload card may be distributed even to a different user in a different location, and subsequently linked or associated with the stored value account underlying the near-field enabled transit card. Such embodiments may, for example, be advantageous for the examples of parents, employers, and federal agencies discussed above.

In accordance with some embodiments of the present invention, the ratio of association between near-field enabled cards and machine-readable reload cards need not be one-to-one. In other words, a near-field enable transit card may access a stored value account that may be funded from more than one machine-readable reload card. Accordingly, a user of the transit card may add value to the underlying stored value card, and a third party (e.g., parent, employer, governmental agency, etc.) may also add value. Similarly, a single machine readable reload card may be linked to more than one transit card. In such embodiments, the multiple transit cards may each access and decrement the same stored value account, or they may each access and decrement their own account, and reload transactions using the machine-readable reload card may need to identify the specific account into which to add value.

With reference to FIG. 1, an exemplary packaging 100 of a transit use card 110 and a transit reload card 120 is depicted. The packaging 100 may comprise a transit use card 110 and a transit reload card 120. The packaging 100 may further comprise information 101 regarding an initial load value of the use card, if any, or may indicate that the use card can be loaded with any amount the user selects, provide options of amounts, etc. The packaging may also comprise a packaging indicia 102 that may be machine readable—for example, a bar code, QR code, magnetic strip, radio frequency identification (RFID) tag, etc. The packaging indicia 102 may be associated with the packaging 100, and may, as discussed in more detail below, be used to activate the use card 110 and the reload card 120. Alternatively, the packaging indicia 102 may not be used to activate the use card 110 and the reload card 120, but rather may be used merely as a stock keeping device for a merchant or retailer to track stock and sales. In this regard, the packaging indicia 102 may be considered to be, or used as, a stock keeping unit (SKU) or a universal price code (UPC).

The use card 110 may comprise one or more indicia, machine readable, communicable, or otherwise. For example, use card 110 may comprise a use card identifying indicia 111 that may identify the use card. With reference to FIG. 1, use card identifying indicia 111 indicates that the use card number is "1234 5678." Use card 110 may further comprise a use card machine readable indicia 112, such as a magnetic strip, bar code, etc. Use card machine readable indicia 112 may incorporate, in whole or in part, use card identifying indicia 111, and may include additional information. For example, use card machine readable indicia 112 may include an issuer identification number (IIN) or a bank identification number (BIN) so that transactions using the use card 110 may be properly routed. Alternatively, the use card machine readable indicia 112 may represent an indicia entirely different than the use card identifying indicia 111.

Note that use card 110 may further comprise elements 113, 114 that may have or otherwise provide communicative abilities to the use card 110. For example, element 113 may be an RFID tag (passive or otherwise) that may provide communication with an RFID-enabled point of sale (POS) system. Similarly, element 114 may be a powered near field transmitter that may communicate with various POS devices. In this manner, the use card 110 may be "tapped" at certain POS systems rather than manually providing the identifying indicia 111 and/or swiping or reading the machine readable indicia 112.

The reload card 120 may similarly comprise a reload identifying indicia 121 that may uniquely or semi-uniquely identify the reload card 120. For example, with reference to FIG. 1, the reload identifying indicia 121 indicates that the reload card is identified by "ABCD EFGH." Reload card 120 may further comprise one or more reload machine readable indicia 122, 123, comprising, for example, a magnetic stripe and/or a bar code. Such machine readable indicia 122, 123 may be used to identify the reload card 120 during reload transactions.

Figure 1B:
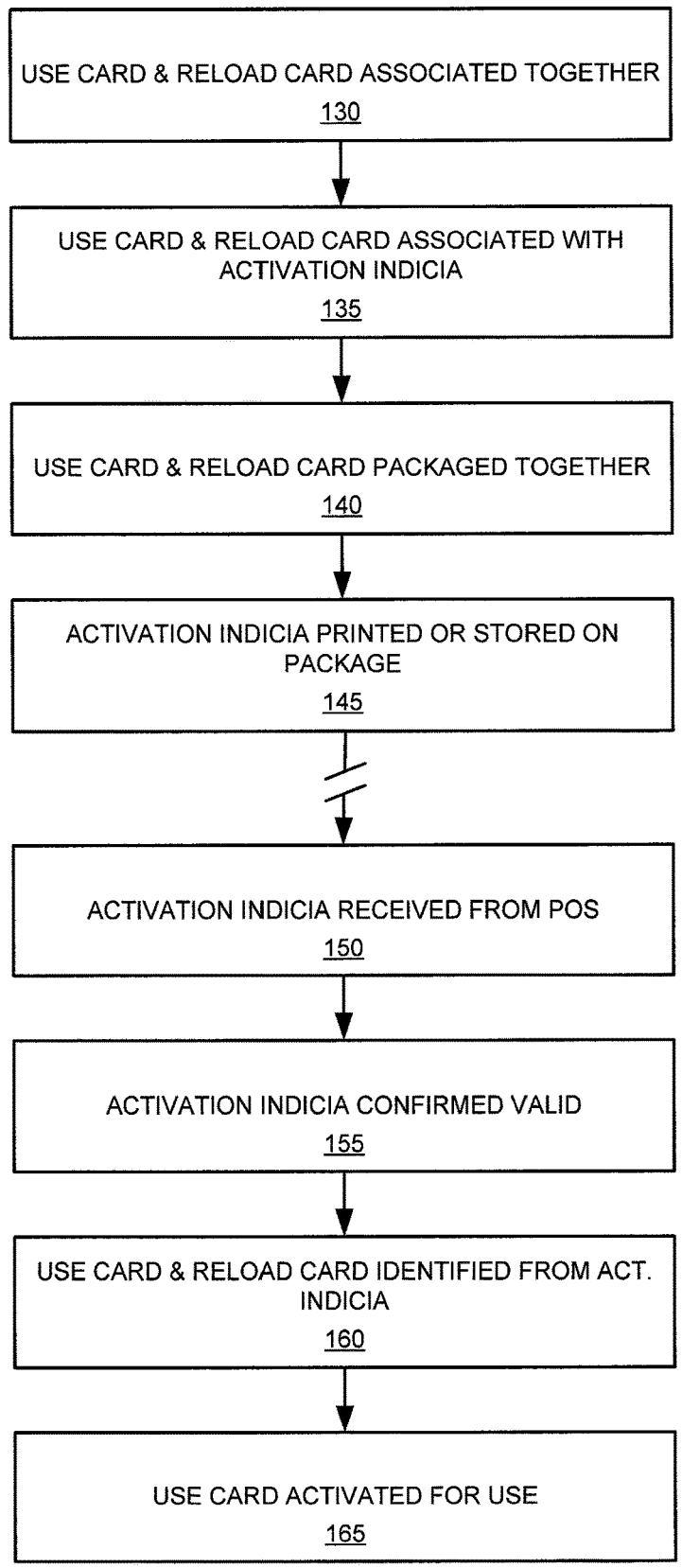
FIG. 1B illustrates an exemplary method of activating a transit use card and a transit reload card, in accordance with some embodiments of the present invention.

With reference to FIG. 1B, an exemplary activation process will now be discussed. At 130 a use card and reload card are associated together. This may occur after the cards are manufactured, or by associating or marrying indicia from each card in a database, regardless of when the cards are manufactured. At 135, the use card and the reload card may be associated with an activation indicia, for example, packaging indicia 102 as set forth in FIG. 1A. Alternatively, since the reload card and the use card are associated with each other, only one of the cards may be directly associated with the activation indicia.

At 140 the use card and the reload card may be packaged together, and at 145 the activation indicia may be printed or stored on the package. Alternatively, the packaging may be printed with an activation indicia which may—after packaging—be associated with the use card and the reload card.

At a subsequent time, at 150 the activation indicia may be received at a central processor from a POS. The central process may confirm that the activation indicia is valid at 155, and may identify the use card and the reload card from the activation indicia at 160. The use card may then be activated for use, and the reload card may be activated to provide reload capabilities.

Note that it is also contemplated that the use card and the reload card be sold in an "active" state, and that the activation transaction instead activates an underlying account, either by placing value in such account or releasing a hold directed at value in such account.

Figure 2:
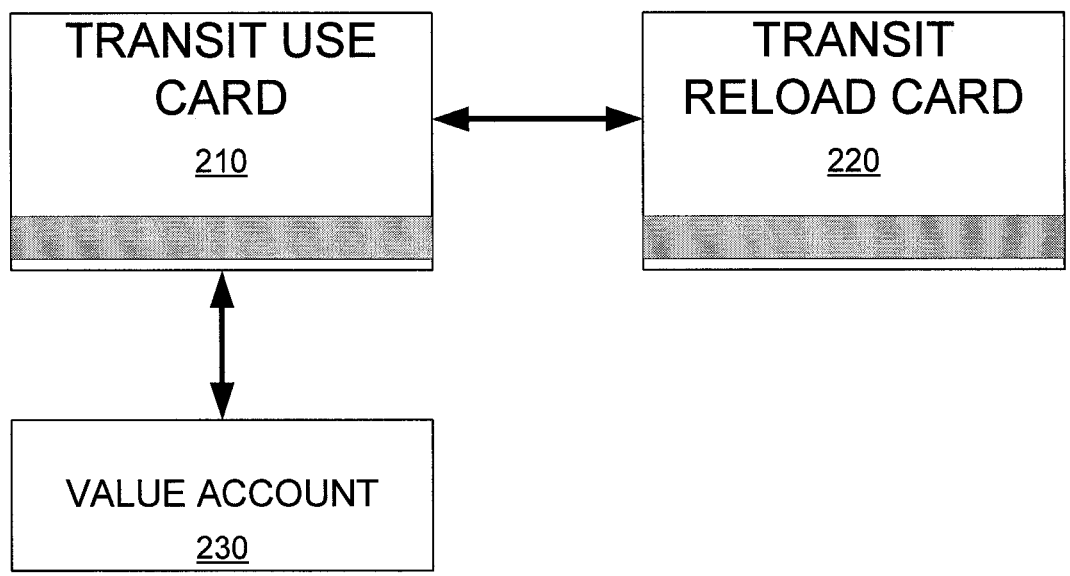
FIG. 2 illustrates an exemplary association between a transit use card, a transit reload card, and an account, in accordance with some embodiments of the present invention.

With reference to FIG. 2, an exemplary association between a transit use card, a transit reload card, and an account, in accordance with some embodiments of the present invention will now be discussed. As can be seen in FIG. 2, a use card 210 is associated with a reload card 220. The use card 210 is also associated with an underlying account 230. The account 230 may be a value account (such as a bank account, credit account, or other financial account), or may be a database account that is in turn associated with a financial amount or account. With reference to FIG. 2, the use card 210 is the primary card, and reload transactions using the reload card 220 may require an identification of the use card 210, and then the value account 230 associated with the use card 210.

Figure 3:
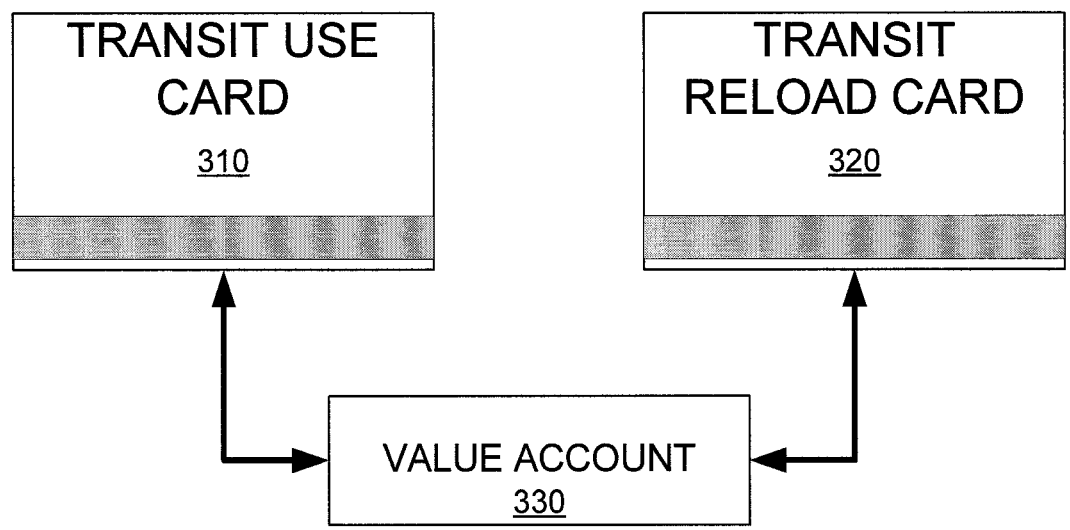
FIG. 3 illustrates an exemplary association between a transit use card, a transit reload card, and an account, in accordance with some embodiments of the present invention.

In contrast, FIG. 3 illustrates an alternative exemplary association between a transit use card, a transit reload card, and an account, in accordance with some embodiments of the present invention. With reference to FIG. 3, a use card 310 and a reload card 320 are both associated with the account 330. Additional security and/or anonymity may be achieved through this arrangement. For example, a reload card 320 may have no connection to the use card 310, and the specifics of the cards use may not be known or obtainable to or by those with access to the reload card. As noted above, such arrangements may be desirable when the party possessing or utilizing the reload card 320 is different than the party possessing or using the use card 310.

It is also contemplated by the present invention that the account associated with the use card and/or the reload card may comprise one or more purses, which in turn may comprise one or more sub-purses. Such purses may have the same or different characteristics. For example, a transportation authority may wish to encourage people to use large-scale, high efficiency transportation, such as subways or rails. Accordingly, $1.00 in a purse for use in subways or rails may be worth $1.25. In contrast, $1.00 in a toll road purse, or parking purse may be equal to $1.00.

Through the use of different purse characteristics, parties may encourage or promote certain activities. If a parent provides a transit card to his or her child, the parent may desire the child use a car rental or ZIP Car service rather than purchase their own car. The parent may then provide a value characteristic of a car rental purse such that $1.00 is equivalent to $1.50, in order to encourage the child to use the car rental. Different value characteristics of purses may be desirable because what is encouraged for one or more users may not be encouraged system wide. Accordingly, rather than adjust the price of the services purchased with the transit card, the amount of value associated with each purse in the transit card may be adjusted on an individual basis (or as group).

For example, an account may comprise a purse directed at tickets or other liabilities that may be incurred during transit. If the transit card is utilized to pay the ticket, a value characteristic may encourage immediate or prompt payment of the ticket. For example, if a ticket is paid upon issuance using a transit card, $1.00 may be equivalent to $1.15. Such increase in value (or corresponding decrease in the amount of the ticket) may be validated by the decrease in administrative costs often associated with ticket payment collection.

In accordance with some embodiments, a use card may be used to provide for transit fees, or may be used to provide payment for a ticket; but not for both. Alternatively, a transit card may be used for transit fees, but once used to pay for a ticket the transit card may be rendered inactive and a new transit card may be obtained.

Figure 4:
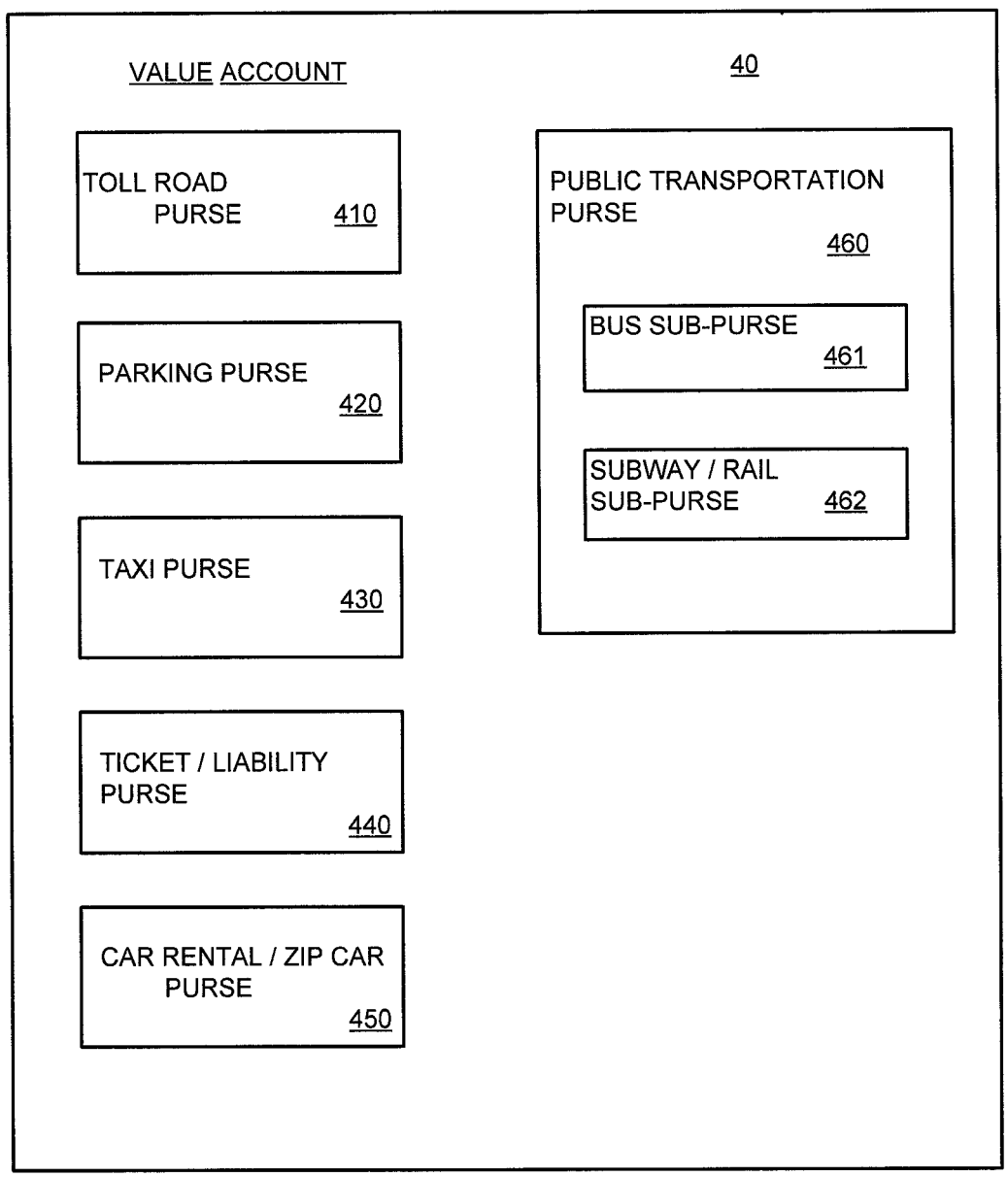
FIG. 4 illustrates an exemplary account arrangement with various purses, in accordance with some embodiments of the present invention.

With reference to FIG. 4, an account 40 may comprise one or more purses. For example, account 40 may comprise a toll road purse 410, a parking purse 420, a taxi purse 430, a ticket/liability purse 440, and a car rental/ZIP car purse 450. Similarly, account 40 may also comprise a public transportation purse 460, which may in turn comprise a bus sub-purse 461 and a subway/rail sub-purse 462. As noted above, each of these purses may comprise different value characteristics.

Such purses may be individually funded (or, for example, by the designation of funds by a party loading or reloading the account), or may be funded evenly or according to a general use algorithm which may take into account average prices, average uses, etc. Alternatively, the purses may not hold value in individual sub-accounts, but may merely reflect how value is treated when used in specific transactions. In other words, the public transportation purse 460 may not specifically hold value, but may indicate that if value associated with the overall account 40 is used in a public transportation context, that certain value characteristics should be applied.

Figure 5:
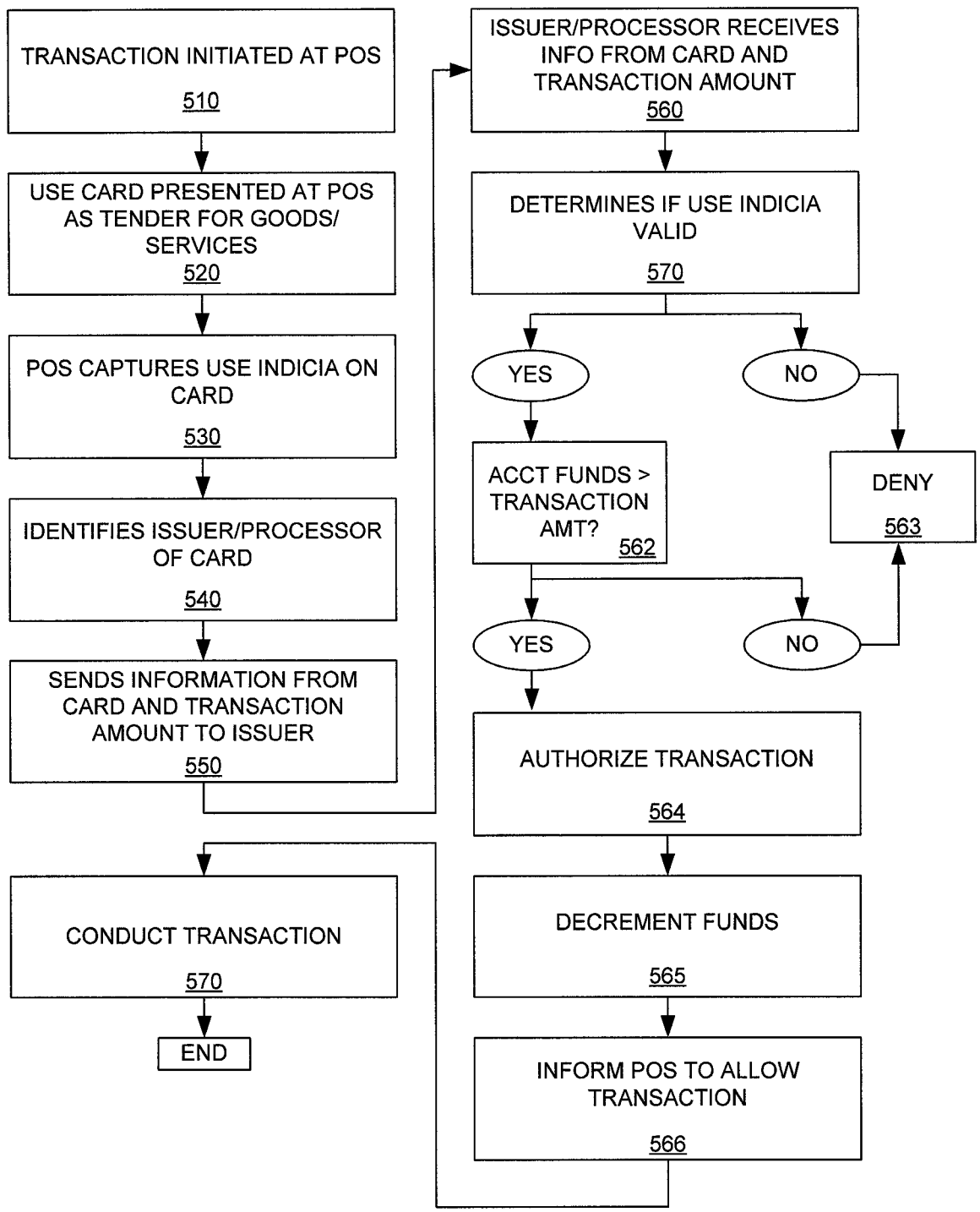
FIG. 5 illustrates an exemplary method of conducting a transaction with a transit use card, in accordance with some embodiments of the present invention.

With reference to FIG. 5, an exemplary method 50 of conducting a transaction with a transit use card, in accordance with some embodiments of the present invention will now be discussed. At 510 a transaction may be initiated at a point of sale (POS). Note that a POS may include a traditional register at a retailer, merchant, or provider of goods and/or services. A POS may further include a meter in a taxi, a fare-box in a bus, a kiosk, a turnstile (for example, at the entrance to a subway system), a parking meter or other meter, a toll booth, a toll collection device that utilizes wireless communications (such as near-field communications utilized by EZPass, EZTag, FastTrak, etc.), and/or any other system in which value is provided in a payment transaction for goods and/or services.

At 520, the use card may be presented at the POS as tender for goods and/or services. Again, the presentment of the use card may be dependent upon the type of POS conducting the transaction. A transaction at a traditional register may be performed by swiping a magnetic stripe on a use card, or reading a bar code or other machine readable indicia thereon. A transaction at a fare-box may be performed with a near-field communication, and the customer may merely tap the use card on a near-field reader. A transaction at a parking meter may involve swiping a use card, or may involve the provision of an indicia on the use card into the meter by a user. The use card may be presented at a highway toll by associating the use card with a device that can be read by the toll system, for example, associating or inserting the use card into a transponder element used in the toll system. Note that the above paragraph is not intended to be limiting, but rather to explain the breadth of what is contemplated by the present invention.

At 530 the POS may capture the use indicia on the use card. As noted above, this indicia may be captured in a variety of manners.

At 540 the POS or a processor associated with the POS (such as a POS host or other central element) may determine a processor or issuer associated with the use card (a "central processor"). Such determination may be based, for example, an IIN or BIN as noted above.

At 550 the POS or a processor associated with the POS may route information regarding the transaction to the central processor. The information may comprise the indicia from the use card and the amount of the desired transaction. Additional information may also be included in the communication, such as the location of the transaction, time and date, etc., which may be used for record keeping purposes, fraud determinations, etc.

At 560 the central processor may receive the information from the POS or a processor associated with the POS, and at 561 the central processor may determine if the use indicia is valid. If the use indicia is not valid, then the central processor may deny the transaction at 563. If the use indicia is valid, the central processor may then identify an account associated with the use indicia and the value, if any, therein. The central processor may then determine if the value in the account is greater than or equal to the amount of the requested transaction at 562. If the amount in the account is not greater than or equal to the amount of the requested transaction, the transaction may be denied at 563. If the amount in the account is greater than or equal to the amount of the requested transaction, the transaction may be authorized at 564, and the amount of the transaction may be decremented from the account at 565. The central processor may then communicate with the POS in order to instruct the POS to continue with the transaction, and at 570 the POS may conduct the transaction.

Note that in order to perform real-time or near-real-time transactions, certain heuristics or short-cuts may be utilized by the central processor. For example, and as discussed in greater detail below, the central processor may maintain a negative database that comprises use indicia associated with accounts that either have no value, insufficient value to obtain any goods and/or services, or accounts that have been associated with some type of fraud. Such negative database may be initially queried by the central processor in order to timely reject transactions associated with such use indicia. Alternatively, the POS systems themselves may be periodically updated with the negative database such that the POS itself can deny a transaction immediately if an indicia listed in the negative database is identified.

Figure 6:
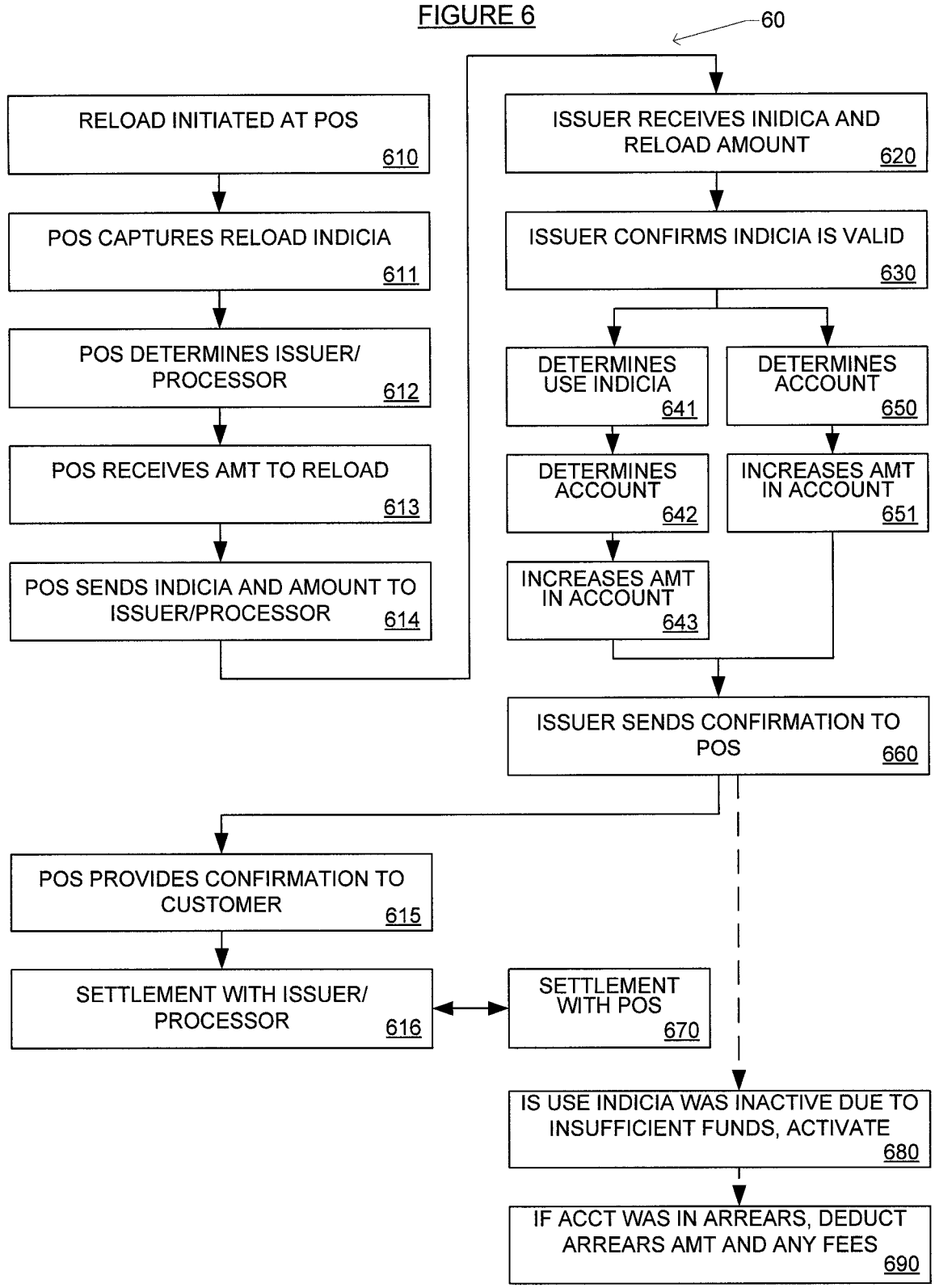
FIG. 6 illustrates an exemplary method of conducting a reload transaction with a transit reload card, in accordance with some embodiments of the present invention.

With reference to FIG. 6, an exemplary method 60 of conducting a reload transaction with a transit reload card, in accordance with some embodiments of the present invention will now be discussed. A reload transaction may be initiated at a POS at 610. The POS may comprise a variety of POS systems as noted above, including an electronic or computerized kiosk. It is also contemplated that a reload transaction may be performed at a POS unrelated to the goods and/or services purchased by the transit use card. In other words, while the use card may be used at a road toll or parking space, the reload card may be used to replenish the underlying account at a convenience store, a big-box store, a web-site or other digital storefront, an application or applet running on a mobile computing device or mobile communication device (for example, a mobile telephone, smart phone, table computer, laptop computer, navigation system, etc.).

At 611, the POS may capture or otherwise obtain the reload indicia on the reload card. The POS may capture this indicia by, for example, reading a machine readable indicia on the reload card such as a magnetic stripe, bar code, RFID tag, etc. Alternatively, the POS may obtain the reload indicia by a user manually entering the reload indicia, for example in the case of an on-line reload transaction or through the use of a mobile computing device or mobile communication device.

It is also contemplated that reload transactions may be conducted over the telephone, for example by communicating with an interactive voice response (IVR) system.

At 612, the POS or a processor associated with the POS (such as a POS host or other central element) may determine a processor or issuer associated with the reload card (the "central processor"). Such determination may be based, for example, an IIN or BIN as noted above. Note that the discussion herein assumes that the central processor that governs reload transactions is the same central processor that governs use transactions. However, it is contemplated that two or more processors may be used, or a single processor may be partitioned to act as two distinct processors. The discussion focuses on a single central processor for clarity, but the invention fully contemplates a division of labor based upon transaction type (reload compared to use or redemption) amongst one or more processors.

At 613, the POS may receive from the customer an amount with which to reload the underlying account associated with the reload card (and accordingly, associated with the use card). The customer may, in accordance with some embodiments, select any amount of value. In accordance with some embodiments, the customer may be presented with reload options, which may be based on currency amounts (e.g., $10, $25, $50) or may be based on specific uses (e.g., 20 subway trips, one (1) month of road tolls, etc.). It is further contemplated by the present invention that a transit system may provide an option of a single payment for an "all-you-can-eat" model, wherein a customer may pay an amount (e.g., $250) for a month of all transit uses, including for example, subways, buses, light-rail, road tolls, and certain limited parking.

At 614 the POS or a processor associated with the POS may communicate with the central processor and provide the reload indicia and the amount of value that is to be inserted into the underlying account.

At 620 the central processor may receive this information, and at 630 the central processor may determine if the reload indicia is valid. If the reload indicia is invalid, the transaction may be denied. If the reload indicia is valid, the reload transaction may be performed in a variety of manners. For example, if the associative structure of the use card, reload card, and underlying account is that as indicated in FIG. 2, the central processor may determine the use indicia associated with the reload indicia at 641, and then at 642 determine the account associated with the use indicia. At 643 the central processor may then increase the amount available in the account associated with the use indicia by the reload amount. If the associative structure of the use card, reload card, and underlying account is that as indicated in FIG. 3, the central processor may determine the account associated with the reload indicia at 650 and add the amount of reload value into this account at 651.

These two manners are not intended to be limiting, but rather to illustrate the variations contemplated by the present invention based upon various associations between and amongst the various cards, accounts, indicia, etc.

At 660 the central processor may send a confirmation to the POS that the reload transaction was successful. At 615 the POS may pass on a confirmation to the user that the reload transaction was successful. Such confirmation may be, for example, a receipt, a confirmation email, an audio confirmation, a text (SMS or MMS) message, or a confirmation screen presented on a computer or kiosk.

Subsequently, at 616, 670 settlement may occur between the POS or a processor associated with the POS and the central processor. Such settlement may occur in a variety of manners, including for example automated clearing house (ACH) transactions.

Providing a reload transaction may also have an impact on the heuristics of the system. For example, as noted above a use card or indicia may be placed on a negative database due to insufficient funds. Accordingly, upon a reload transaction, the central processor may at 680 cause an activation of the use indicia, thereby removing it from the negative database. If the account was in arrears, at 690 the amount of arrears may be deducted from the underlying account before rendering the use indicia available for use.

Figure 7:
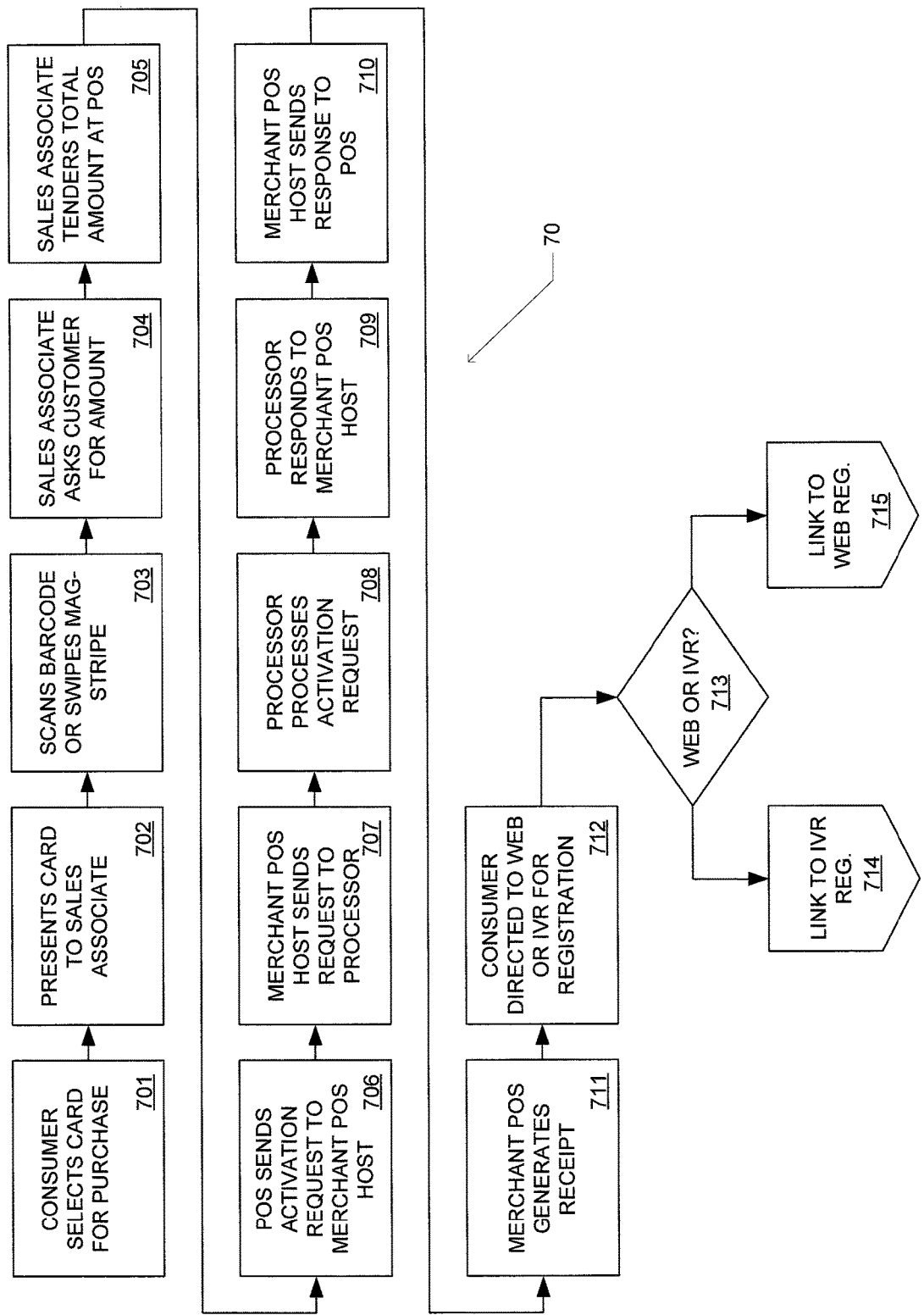
FIG. 7 illustrates an exemplary method of conducting a sale of a transit use card, in accordance with some embodiments of the present invention.

With reference to FIG. 7, an exemplary method 70 of conducting a sale of a transit use card, in accordance with some embodiments of the present invention, will now be discussed. Before discussing the individual steps, it is important to note that while numerous steps are shown in FIG. 7 and explained below, each step is not necessarily required. Rather, the method 70 as set forth in FIG. 7 may be representative of a specific arrangement and sale process; various steps may be deleted and/or added to the process without deviating from the invention.

At 701 a consumer may select a transit use card for purchase. The transit use card may be preassociated with a reload card, or may be individually sold with a pre-set value. In the case of a pre-set value, a reload may be purchased at a later time and subsequently associated with the use card and the underlying account associated with the use card. At 702, the customer may present the card to at the POS for purchase, and at 703 the POS may capture or otherwise receive an indicia off of the use card in order establish the sale of the use card.

If the use card is not preloaded with a pre-set value, at 704 the customer may be prompted to provide a load amount. The customer may be prompted through a digital communication (for example, on a screen of a kiosk, over the phone, through a text (SMS, MMS) message, etc.), or may be prompted by a sales associate asking the customer how much value to load.

At 705 the customer may tender the total amount to the POS. The total amount may include an initial fee of purchasing the card, and/or any additional taxes, fees, or charges that may be applicable and/or required.

At 706 the POS or a processor associated with the POS may send an activation request to be routed, eventually, to the central processor that processes transactions regarding the use card. Initially at 706 this communication may be routed to the POS host, and at 707 be routed from the POS host to the central processor. At 708 the central processor may process the activation request and, if successful, send a response back to the POS host at 709. At 710 the POS host may send the response indicating the activation was successful to the specific POS that is conducting the transaction. The transaction may then be completed, and at 711 the POS may generate a receipt detailing the transaction. Such receipt may be in paper form, digitally provided, or may comprise audio information that may be played to the customer.

Optionally, at 712, the customer may be directed to register the use card via the Internet or via an IVR system 713. If the customer selects IVR it may linked to an IVR registration system at 714, and if the customer selects web or Internet it may linked to a web registration system at 715.

Registration may be encouraged for several reasons. If a use card is registered and misplaced, a customer may request that the central processor disable the use card and provide a replacement card in its stead. If a use card is registered, a reload card may be more easily associated with the use card. Moreover, if a use card is registered, a customer may have an option to associate a payment device such as a credit card, debit card (or other open-loop or semi-open-loop type card), checking account, etc. with the use card, such that when the balance in the account underlying the use card is decremented below a certain level, a recharge of a specified amount may be automatically performed.

It is also contemplated by the present invention that the use card may be a combined purpose card with closed-loop functionality to operate within a transit system, and open loop functionality to operate outside of the transit system. For example, a prepaid Visa Card may be equipped with a closed-loop purse that may be utilized within a transit system. In such circumstances, when the closed-loop purse falls below a certain level, the closed-loop purse may be automatically recharged from the open-loop side of the product.

Figure 8:
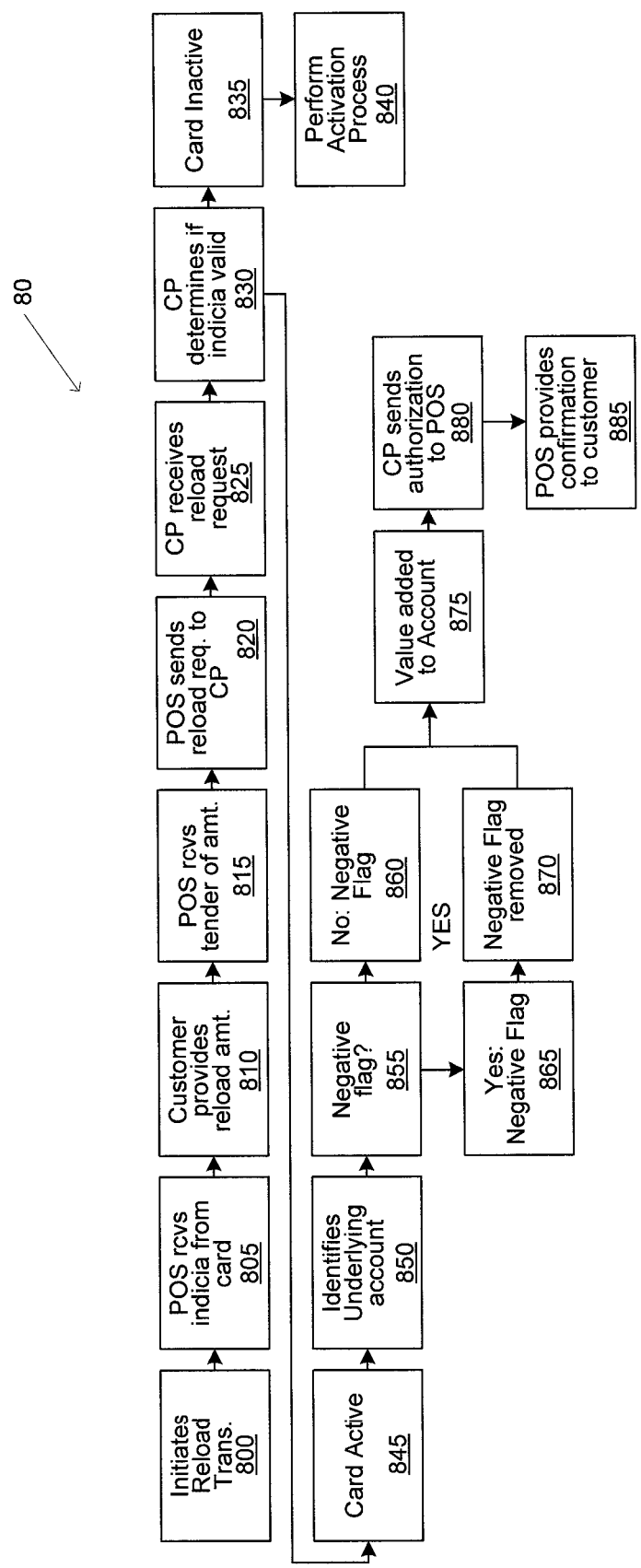
FIG. 8 illustrates an exemplary reload transaction, in accordance with some embodiments of the present invention.

With reference to FIG. 8, a method 80 of an exemplary reload transaction, in accordance with some embodiments of the present invention, will now be discussed. At 800 a customer may present a card at a POS for a reload transaction. It is anticipated that the customer may present a reload card, though it is also contemplated that the customer may present the use card for direct reload. At 805 the POS may receive from the customer the an indicia from the card, and at 810 the POS may receive the amount of reload sought by the customer. At 815 the POS may receive actual tender of the reload amount (plus any applicable taxes, fees, charges, etc.). At 820 the POS (or a POS host or other processor associated with the POS) may send a reload request to the central processor. At 825 the central processor may receive the reload request and at 830 the central processor may determine if the indicia identifying the card is valid, and the card is active. If the card is determined to be inactive at 835, then the process may be routed as an initial activation process at 840, much as discussed above. If the indicia is valid and the card is active as determined at 845, the central processor may identify the underlying account at 850.

At 855 the central processor may determine if the underlying account is in arrears, or if the associated cards and account are listed in the negative database. If the card and/or account is flagged in the negative database at 865, provided the reload amount is sufficient to remove the account from an arrears status the listing in the negative database will be removed at 870. If the card and/or account is determined as not being listed in the negative database at 860, or following the removal of the negative flag at 870, the central processor may add value to the underlying card account. The value may be the specific reload value specified by the customer, or may be the reload value specified by the customer less any applicable or required fees, taxes, charges, etc.

At 880 the central processor may send a message indicating success of the reload transaction to the POS, POS host, or processor associated with the POS, and the POS may then convey a confirmation of the reload transaction to the customer at 885.

Figure 9:
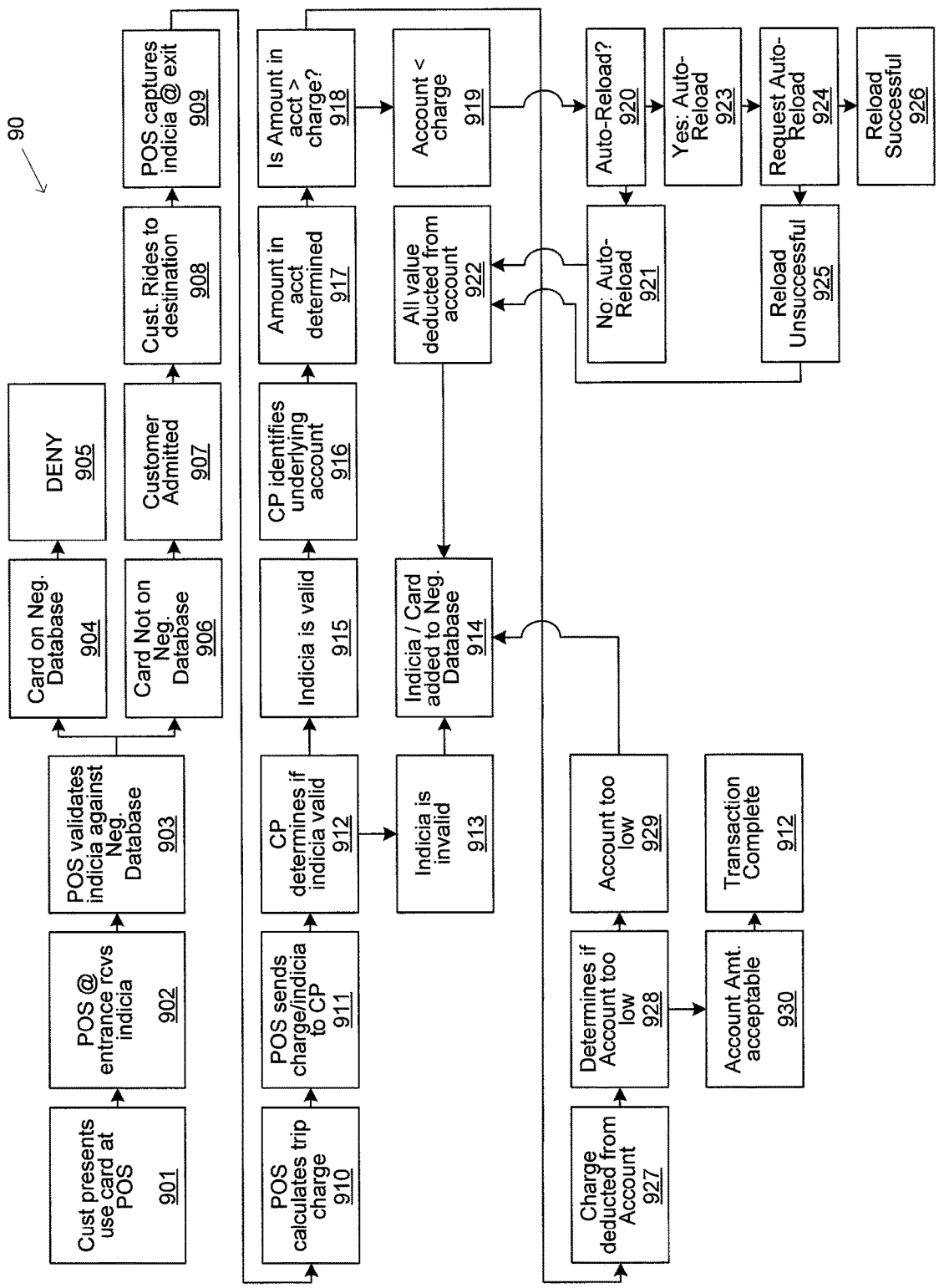
FIG. 9 illustrates an exemplary use transaction, in accordance with some embodiments of the present invention.

With reference to FIG. 9, an exemplary use transaction 90, in accordance with some embodiments of the present invention will now be discussed. As with previous methods discussed, note that various steps may be omitted or added to the method discussed below, without deviating from the invention.

With reference to FIG. 9, the method is directed to circumstances where the final amount to be charged to the customer's use card may not be known until the customer completes his or her travel. For example, prices for subway rides may vary based upon the route, distance, and/or duration of the ride. Similarly, road tolls are often related to the overall distance traveled on the toll road, or to the municipalities passed through on the toll road. Similarly still, a customer may travel within a transit system (bus to subway, subway to light rail, light rail to parking) and be charged at the end of the travels rather than for each leg along the way. Accordingly, the method as set forth in FIG. 9 may illustrate a situation where the POS may grant access to the customer and then later charge the full amount of the customer's travels against the use card.

At 901 a customer may present a use card at a POS. Again, the POS can take many forms as noted above. At 902 the POS may, at the entrance to the transit system or specific transit device (e.g., taxi, subway, bus, toll road, etc.) capture or otherwise receive an indicia from the use card. The POS may validate the indicia against a negative database at 903 to determine if the card is associated with an invalid card, or one associated with an underlying account that is in arrears, has a zero balance, or has a balance insufficient to pay for any goods and/or services in the transit system. For example, a card may have a balance of $0.78, but a minimum bus ride, subway trip, toll road, or taxi fare may be $1.10.

If the card is listed on the negative database, at 904, the transaction may be denied at 905 and the customer prevented from entering the transit device. Prevention may comprise a locked turnstile, a gate that does not rise at a toll booth, or a bus driver preventing entrance.

Such local preauthorization of the card may be desirable in that it allows a POS to effectively screen riders who are unlikely to provide adequate payment for services, without requiring timely communications with the central processor. The central processor may periodically update the POS systems, for example by reaching into a database queried by the POS and modifying the listing of cards and/or accounts in the negative or positive database.

If the POS determines that the card is not listed on the negative database at 906 (or alternatively and equivalently listed on a positive database), the customer may be admitted to the transit system at 907. At 908 the customer may travel in the transit system to his or her destination, and at 909 the customer may exit the transit system and again present the use card at the POS. At 910 the POS may determine the total charge for the trip the customer traveled, and at 911 the POS (or a POS host or a processor associated with the POS) may send the total charge and the indicia captured or otherwise obtained from the use card to the central processor.

At 912 the central processor may determine if the card number is valid. If it is determined at 913 that the card number or indicia is not valid, then the card, indicia, or underlying account may be added to the negative database at 914. If it is determined that the card number is valid at 915, then the central processor may identify the underlying account at 916, and determine the amount of value in the underlying account at 917.

At 918, the central processor may determine if the amount of value in the underlying account is equal to or greater than the total charge. If the amount in the account is determined to be less than the total charge at 919, then at 920 the central processor may determine if a source of automatic reload is associated with the use card or underlying account. If there is no source of automatic reload at 921, then at 922 the central processor may deduct all available funds from the underlying account, and note the amount the underlying account is in arrears. The process may then move to step 914, where the card, indicia, or underlying account may be added to the negative database.

If it is determined at 923 that there is an identified automatic reload associated with the use card or underlying account, then the central processor may request a reload transaction with the identified value source at 924. If it is determined at 925 that the reload transaction is unsuccessful, then the process may be returned to step 922 where all available funds are deducted from the account and the card, indicia, or underlying account may be listed in the negative database.

If it is determined at 926 that the reload transaction was successful, then the process may continue.

Whether the reload transaction was successful in 926, or the amount in the underlying account was greater than or equal to the total charge as determined at step 918, the central processor may then deduct or decrement the amount of value in the account by the total charge at 927. At 928 the central processor may then determine if the balance remaining in the underlying account is too low to pay for any goods and/or service in the transit system (as noted above), and if at 929 the account is deemed too low for use, the card, indicia, or underlying account may be listed in the negative database at 914.

If it is determined at 930 that the amount remaining in the account is acceptable (that is, over a minimum threshold established that would allow for the purchase of at least some goods and/or services from the transit system), then the transaction is concluded at 931.

Figure 10:
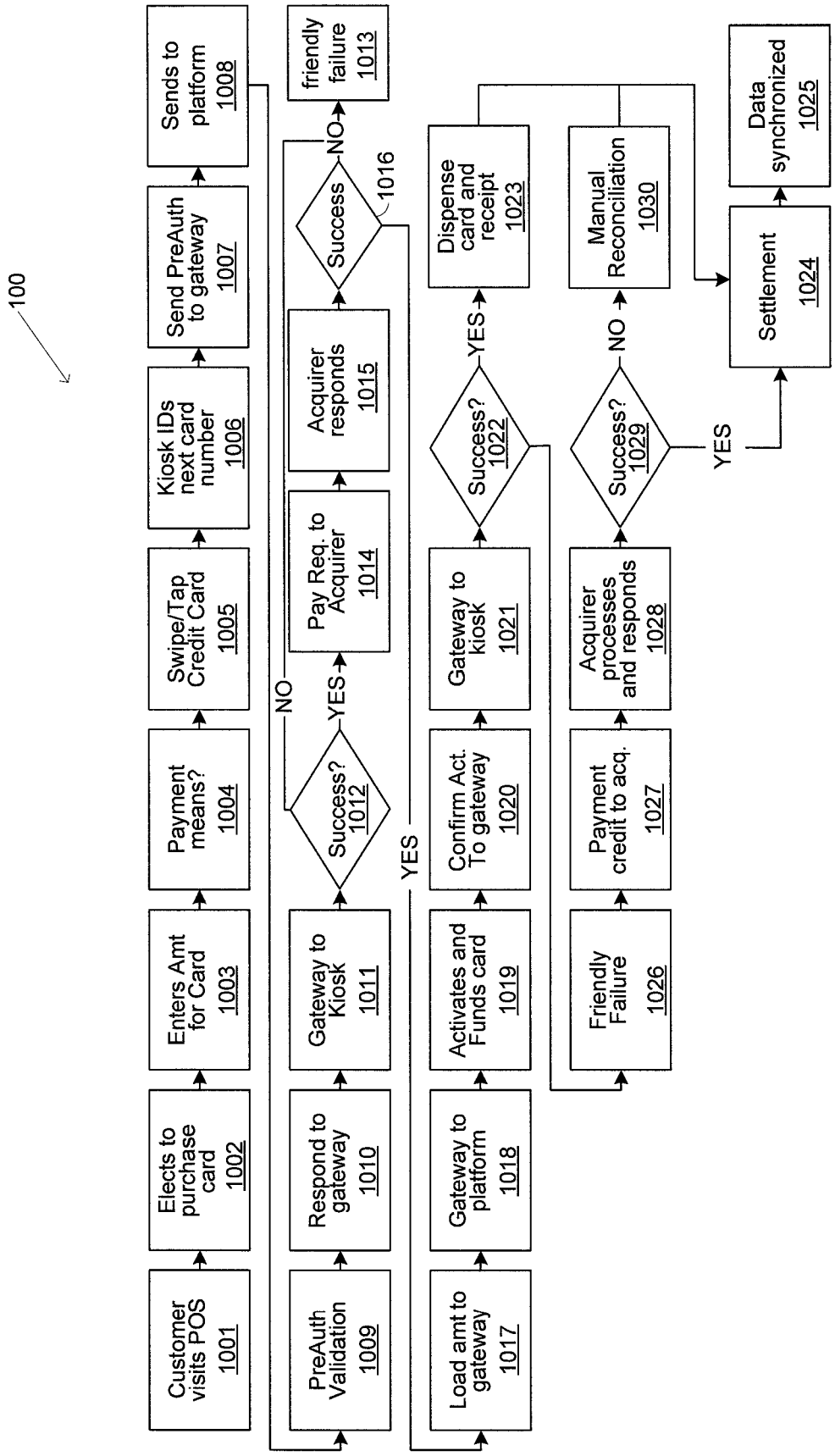
FIG. 10 illustrates an exemplary sale of a transit card, in accordance with some embodiments of the present invention.

With reference to FIG. 10, an exemplary sales process 1000 of a transit card, in accordance with some embodiments of the present invention will now be discussed. Note that the method disclosed in FIG. 10 is exemplary only, and various steps may be added or omitted from the process. The method set forth in FIG. 10 is somewhat specific, as it is intended to disclose what an actual transaction may include; however, the invention as set forth herein and claimed may not require each of the elements or steps set forth in FIG. 10.

At 1001 a customer may visit a POS location, for example, an electronic or automated kiosk. At 1002 a customer may choose to purchase a transit card by utilizing a customer interface at the kiosk. At 1003, the customer may enter the amount to fund the transit card with, and at 1004 the customer may choose or select a payment method. The customer may pay for the transit card using cash, credit, debit, and/or any other value type accepted by the kiosk. The customer may pay the amount to be funded on the transit card, or may pay more, after required or appropriate taxes, expenses, charges, and/or fees are applied to the purchase transaction. The kiosk customer may, for example, at 1005 select a payment method using a credit or debit card, and may swipe or tap the credit or debit card. At 1006, the kiosk may identify the next available card number (which may be sequentially, according to an algorithm, random, or semi-random) and at 1007 the kiosk may send a pre-authorization request to a gateway of the central processor. At 1008 the gateway of the central processor may send the preauthorization request to the proper platform of the central processor, which may at 1009 perform preauthorization activation validations. At 1010 the central processor platform may respond to the central processor gateway, which in turn may transmit at 1011 a communication back to the kiosk.

At 1012, if the preauthorization transaction was not successful, then at 1013 the kiosk may present the customer with a friendly failure message, requesting the customer try again.

If the preauthorization transaction was successful, then at 1014 the kiosk may send a payment request to the merchant acquirer associated with the payment card presented by the customer. At 1015 the merchant acquirer may process the payment and send a response to the kiosk. At 1016 the kiosk may determine if the payment request was successful, and if not the customer may be presented with friendly failure message as in step 1013. If the payment request was successful then the kiosk may send an activation request with the load amount to the central processor gateway at 1017, which may then be routed to the appropriate central processor platform at 1018. At 1019 the central processor platform may activate the card and fund the associated account with the amount requested, and at 1020 the central processor platform may provide confirmation of the same to the central processor gateway.

At 1021 the central processor gateway may respond to the kiosk with the current status. If the activation was successful at 1022, then the kiosk may distribute the transit card and a receipt to the customer at 1023. Settlement may later occur between the central processor and the kiosk at 1024, and records may be synchronized at 1025.

If the activation was not successful at 1022, then at 1026 the customer may be presented with a friendly failure message, and at 1027 the kiosk may then refund the customer's payment card by sending a credit request to the merchant acquirer at 1027, received by the merchant acquirer at 1028, and responded back to the kiosk at 1028. If the payment credit is determined at 1029 to be unsuccessful, then at 1030 the payment may be logged for manual reconciliation at a later time. If the payment credit transaction is successful at 1029, then the process may continue to 1020 where settlement may later occur, now between the kiosk and merchant acquirer, and records may be synchronized at 1025.

The exemplary method as set forth in FIG. 10 and the discussion above is transacted amongst several parties: a customer; a kiosk (or retailer); a central processor that issues and supports the transit card; and a payment source. It is contemplated by the present invention that the kiosk may be maintained, run by, or associated with the central processor thereby rendering some of the communications discussed above unnecessary. It is also contemplated that in the case of a cash purchase, the communications discussed above and illustrated in FIG. 10 that include the merchant acquirer may be unnecessary.

In other words, various modifications, alterations, and changes may be made, depending on the type of transaction, the identity and number of parties, the relationships amongst the parties, and/or a variety of other factors.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense, and that the scope of the invention will be solely determined by the appended claims.

What is claimed is:

1. A method of conducting a transit use card transaction, the method conducted amongst a central processor comprising an account associated with a transit use card and a data store comprising a status of the account, a point of sale (POS), and one or more transit system payment devices, the method comprising:
    adding value to the transit use card using a separate transit reload card, the separate transit reload card being associated with an account accessible by the transit use card and usable only to add value to the account but being incapable of accessing and using funds in the account, the funds accessible by the transit use card, the separate transit reload card comprising an identifying indicia, such that a POS is configured to receive the identifying indicia of the transit reload card during a reload transaction;
    activating the transit use card and the transit reload card using an indicia disposed on packaging, the packaging containing the transit use card and transit reload card together;
    receiving by the central processor from the transit system payment device an indicia including information identifying the transit use card at an entrance to a particular transit device of a particular transit type, the transit use card being used to pay value for any fare, toll, or any other sort of transit charge from the account;
    preauthorizing use of the card by determining by the transit system payment device whether the indicia is valid for the transit use card transaction for the particular transit type of the transit device based on factors including the status of the account, wherein the status of the account includes whether or not the amount of value associated with the account is over a minimum threshold established that would allow for the purchase of at least some goods or services from the particular type of the transit device;
    if the transit system payment device determines that the status of the account is not authorized for transit use card transaction for the particular transit type of the transit device, denying the transaction and preventing a customer of the transit use card from entering the transit device;
    if the transit system payment device determines that the indicia is valid for the transit use card transaction for the particular transit type of the transit device, admitting the customer of the transit use card to the transit device;
    determining by the central processor whether value associated with the account is greater than or equal to the amount requested by a fee redemption request for the transit use card transaction from the transit system payment device;

if the value associated with the account is less than the amount requested by the fee redemption request, communicating a denial of the fee redemption request to the requesting transit system payment device;

if the value associated with the account is greater than or equal to the amount requested by the fee redemption request:
  communicating approval of the fee redemption request to the requesting transit system payment device;
  deducting the amount of the fee redemption request from the account.

2. The method of claim 1, wherein the indicia including information identifying the transit use card comprises a machine readable indicia printed or stored on the transit use card.

3. The method of claim 1, further comprising:
receiving at the central processor from a retailer point of sale (POS) an activation request comprising information identifying the transit use card;
determining by the central processor:
  if the indicia including the information identifying the transit use card is valid; and
  the account associated with the transit use card; and
activating the transit use card by the central processor.

4. The method of claim 3, wherein the transit use card and a reload card are disposed in a package prior to activation and the activation request further comprises information read or obtained by the POS from the package.

5. The method of claim 1, wherein the particular transit type of the transit device is selected from the group consisting of: a taxi, a bus, a subway, a road or bridge toll, a parking meter, a train or light rail, a trolley, and a car rental.

6. The method of claim 1, wherein the transit processor is centrally located amongst a transit system.

7. The method of claim 1, wherein the transit processor is associated with a particular transit type.

8. The method of claim 1, wherein the transit processor is associated with a specific point of sale processor.

9. The method of claim 1, further comprising:
upon a determination by the central processor that exit from the particular transit type used in a fee redemption request is necessary, and that the value associated with the account is less than the amount requested by the fee redemption request:
authorizing the transit use card transaction for the total amount of value in the account; and
deducting the amount of the fee redemption request from the account, thereby causing a negative balance in the account.

10. The method of claim 1, wherein the method is performed in real or near real-time.

11. The method of claim 1, wherein the fee redemption request is associated with a citation for parking, driving, or toll violation.

12. The method of claim 11, further comprising:
upon payment of the citation using the account, terminating the account thereby rendering the transit card invalid for future use.

* * * * *